United States Patent [19]

Weldon

[11] 4,320,318
[45] Mar. 16, 1982

[54] BRUSH ACTUATION MECHANISM

[75] Inventor: William F. Weldon, Austin, Tex.

[73] Assignee: Electric Power Research Institute, Inc., Palo Alto, Calif.

[21] Appl. No.: 900,037

[22] Filed: Apr. 25, 1978

Related U.S. Application Data

[63] Continuation-in-part of Ser. No. 735,874, Oct. 26, 1976.

[51] Int. Cl.³ .............................................. H02K 13/00
[52] U.S. Cl. .................................... 310/219; 310/241
[58] Field of Search ............... 310/178, 219, 232, 249, 310/241, 229, 230, 239, 46, 231, 143, 147, 148; 322/248; 318/541, 542

[56] References Cited

U.S. PATENT DOCUMENTS

| | | | |
|---|---|---|---|
| 1,778,640 | 10/1930 | Maher | 310/178 |
| 1,944,952 | 1/1934 | Rouge | 310/178 |
| 2,759,145 | 8/1956 | Manley | 310/143 |
| 3,226,666 | 12/1965 | Lord | 310/232 |
| 3,497,739 | 2/1970 | Appleton | 310/178 |
| 3,940,644 | 2/1976 | Manz | 310/148 |
| 3,944,865 | 3/1976 | Jewitt | 310/178 |
| 4,110,648 | 8/1978 | Stillwagon | 310/178 |

Primary Examiner—R. Skudy
Attorney, Agent, or Firm—Townsend and Townsend

[57] ABSTRACT

The present invention provides an improved system for controlling the location of a ring of sliding electrical contacts relative to a rotor. A magnetic field is generated generally parallel to the axis of the rotor. An electrical conductor has a generally circular portion which is located proximate the ring of sliding electrical contacts and mechanically coupled thereto. An electric current is passed through the circular portion of the conductor to induce radial movement of the circular portion to thereby move the sliding contacts radially with respect to the rotor.

10 Claims, 5 Drawing Figures

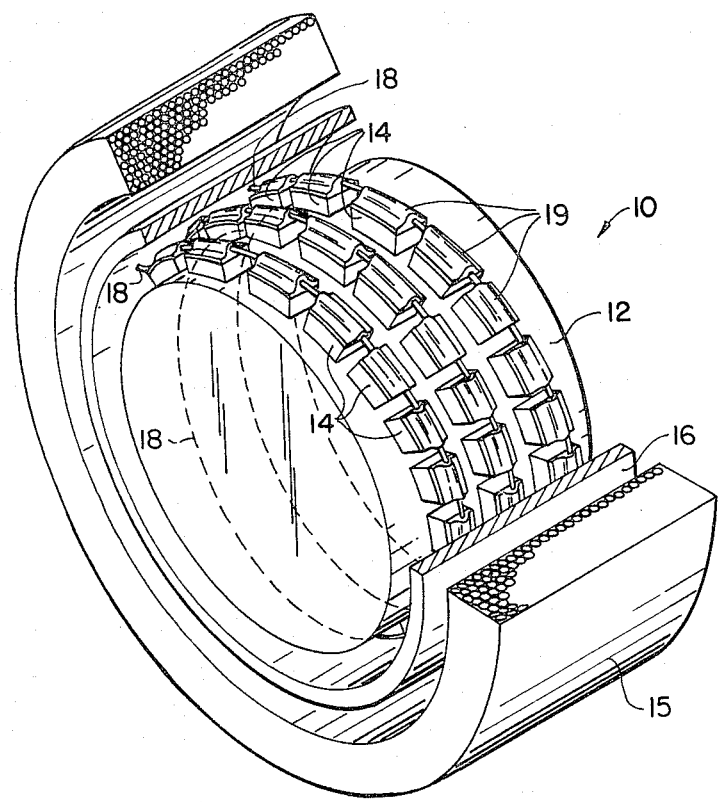
FIG._1.
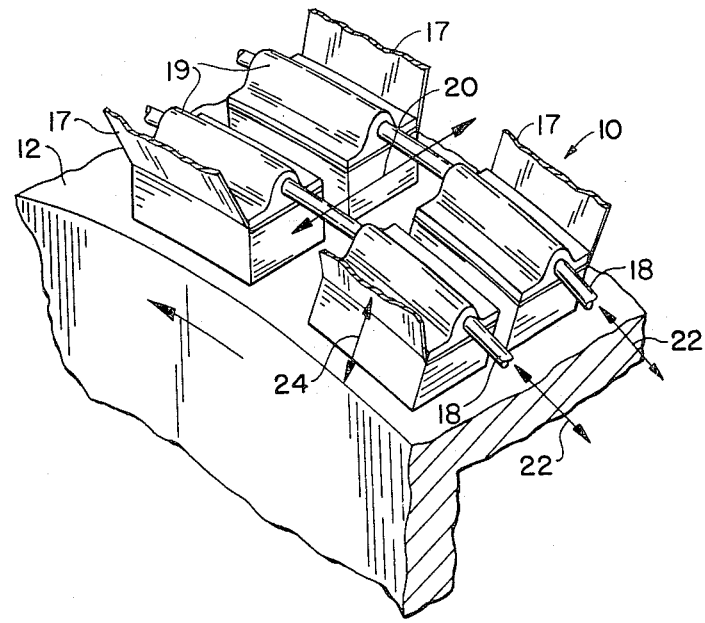
FIG._2.

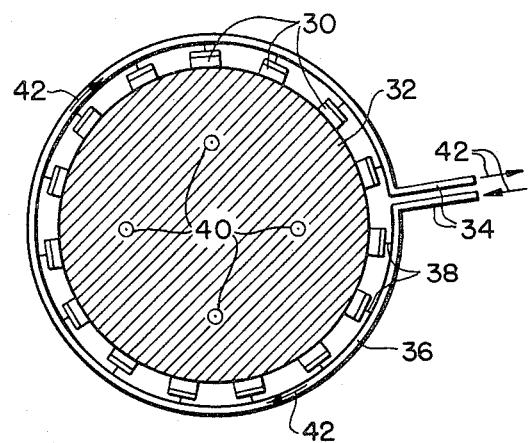
FIG.\_3A.
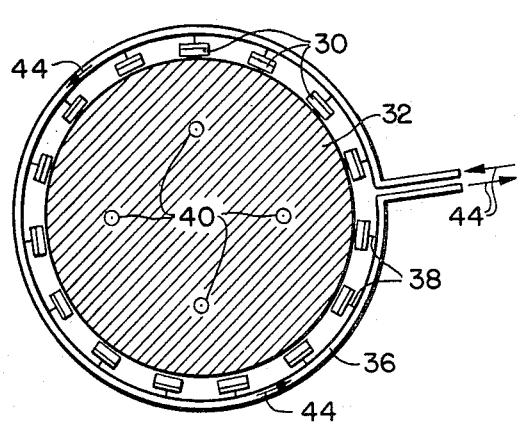
FIG.\_3B.
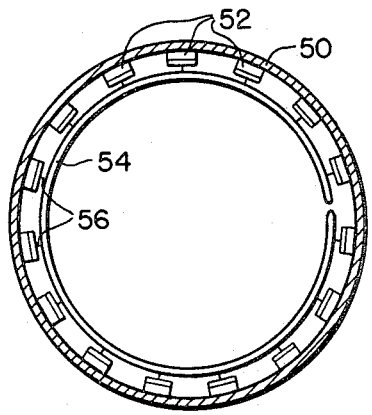
FIG.\_4.

BRUSH ACTUATION MECHANISM

This is a continuation-in-part of application Ser. No. 735,874, filed Oct. 26, 1976.

BACKGROUND OF THE INVENTION

The present invention provides an improved system for controlling the location of sliding electrical contacts relative to a rotor.

A wide variety of different types of electrical machinery, such as DC motors, employ one or more rings of sliding electrical contacts or brushes in contact with a rotor. One such item, called a homopolar machine, has recently become the subject of intensive research as a storage device for energy. The homopolar machine includes a large fly wheel, and energy is stored as kinetic energy through rotation of the fly wheel. Energy is tapped from or delivered to the fly wheel as a pulsing electric current when one or more rings of sliding electrical contacts are placed in contact with a rotor which rotates with the fly wheel.

A problem with all electrical devices using sliding contacts with a rotor, and a special problem with homopolar devices as described above, is the heat loss and wear caused by friction between the sliding electrical contacts and the rotor. Since a homopolar machine is designed to be a mechanism for the storage of energy, excessive loss of energy through friction substantially defeats the purpose of the device. The contacts are usually constructed of liquid metal to reduce friction, but the friction still remaining seriously degrades the feasibility of homopolar machines.

In order for a homopolar machine to be feasible from an energy conservation standpoint, precise control of the pressure between the sliding electrical contacts and the rotor to achieve a good electrical connection without undue friction is required. Also, with such homopolar machines it is usually desirable to move the sliding electrical contacts into and out of contact with the rotor relatively frequently.

In the past, different types of systems have been the subject of experimentation for moving the sliding electrical contacts relative to the rotor in a homopolar machine and other such devices. Hydraulic, pneumatic and solenoid systems have been developed, but none of these systems has achieved the desired efficiency in precisely controlling the location of the electrical contacts relative to the rotor, and the rapid cycling of the contacts into and out of contact with the rotor. As a result, friction losses between the contacts and the rotor remain a serious impediment to the development of an efficient homopolar device.

SUMMARY OF THE INVENTION

The present invention provides an improved system for controlling the location of a ring of sliding electrical contacts relative to a rotor. A magnetic field is generated generally parallel to the axis of the rotor. An electrical conductor having a generally circular portion is located proximate the ring of sliding electrical contacts and mechanically coupled thereto. An electric current is passed through the circular portion of the conductor to induce radial movement of the circular portion to thereby move the sliding contacts radially with respect to the rotor.

The present invention provides precise control over the location of the sliding contacts relative to the rotor, and the pressure exerted on the rotor by the contacts. As a result, a continuous electrical connection can be made between the sliding contacts and the rotor without undue friction. In addition the sliding electrical contacts can be rapidly moved into and out of contact with the rotor to satisfy the cycling requirements of a homopolar machine. Because the environment in which the system is used, such as in a homopolar machine which normally includes a magnetic field axially aligned with the rotor, the present invention can be readily implemented in existing designs by simply adding an electrical conductor mechanically coupled to the sliding contacts.

The preferred embodiment of the present invention contemplates electrically isolating the sliding contacts from the conductor to which they are attached. This allows the current that is passed through the electrical conductor to be isolated from the transfer current that is communicated from the rotor by the sliding electrical contacts. Since control over the radial location of the sliding electrical contacts is achieved by the current passed through the electrical conductor (in conjunction with the axial magnetic field of the machine), relative placement of the sliding electrical contacts can be effected absent communication of transfer current from the rotor by the sliding electrical contacts. An advantage of this feature is that the sliding electrical contacts can be brought into and out of electrical engagement with the rotor, absent communication of the transfer current therebetween, thereby avoiding the possibility of harmful and destructive electrical arcing between the contacts and rotor.

The novel features which are believed to be characteristic of the invention, both as to organization and method of operation, together with further objects and advantages thereof will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of the brush actuation mechanism of the present invention;

FIG. 2 is an enlarged fragmentary view of the brush actuation mechanism illustrated in FIG. 1;

FIGS. 3A and 3B are axial schematic views of the present invention used with a disc rotor and illustrating operation of the invention; and FIG. 4 is an axial schematic view of the brush actuation mechanism of the present invention used with a cylindrical rotor.

BACKGROUND OF THE INVENTION

The brush actuation system 10 of the present invention is illustrated generally by way of reference to FIGS. 1 and 2. Mechanism 10 is adapted to be used with a rotor 12 which forms a part of an item of electrical machinery such as a homopolar machine. A plurality of sliding contacts 14 are disposed about rotor 12 in one or more loops or rings (the terms "loops" and "rings" are used interchangeably herein). Typically, several loops or rings of electrical contacts are used as illustrated in FIG. 1. A coil winding 15, typically used by such electrical machinery for generating a magnetic field for current generating purposes, is positioned in substantially surrounding relation and concentric with rotor 12 and the loops of sliding contacts 14.

Interposed between the coil winding 15 and loops of sliding contacts 14, and surrounding the latter, is a collector band 16, fabricated from a conductive material such as copper or the like. Electrically and mechanically interconnecting each sliding contact 14 and the collector band is a locating strap 17. (Shown in FIG. 2 only, the locating straps are omitted from FIG. 1 so as not to clutter the Figure and impede illustration of those points FIG. 1 is meant to show.) Each locating strap is tightly affixed to the collector band 16 by a bolt (not shown) or any other fastening apparatus capable of tight electrical connection. The sliding contact 14 is affixed to the locating strap by silver-soldering the two together, thereby obviating the need of additional brush or contact material to hold a bolt or fastening screw. Also not shown, but as those skilled in the art will readily recognize as being inherent, are return connections to the rotor for completing the circuit required by the transfer current.

In addition to establishing electrical communication between each sliding contact and collector band 16, each locating strap acts to hold its respective sliding contact to ensure proper engagement between the sliding contact and rotor 12.

The present invention provides an electrical conductor 18 having several generally circular loops corresponding with the various rings of electrical contacts 14. Each contact 14 includes a bracket 19 which mechanically couples conductor 18 to each of the contacts (with a portion of the locating strap sandwiched therebetween) but electrically insulates the contact (and strap) from the conductor.

In operation, a magnetic field, depicted by arrow 20 in FIG. 2, is applied axially with respect to rotor 12 by passing an electric current through coil winding 15. The magnetic field is applied to both rotor 12 and conductor 18. An electric control current can then be passed through the circular portions of conductor 18 in either of two directions, as depicted by arrows 22. The crossing of the current through electrical conductors 18 with the axial magnetic field causes a magnetic force to act upon the circular portions of the conductor 18 which, in turn, moves the conductor radially with respect to rotor 12. Since electrical contacts 14 are mechanically coupled to conductor 18 by brackets 19, radial movement of the circular portions of conductor 18 induce a corresponding radial movement of contacts 14 with respect to rotor 12, as depicted by arrow 24. The relative movement of contacts 14 with respect to rotor 12 and the frictional engagement between the contacts and the rotor are controlled by the magnitude and direction of the current through the conductor 18.

It is advantageous at this point to note that the magnetic field utilized by the present invention is usually inherent in this type of electric machine. For example, the homopolar generator structure discussed herein typically utilizes coil windings substantially similar to coil winding 15 of FIG. 1. Accordingly, the generation of a magnetic field for operation of the present invention need not require additional coil windings but can use the coil winding typically associated with electrical machinery of the type illustrated herein.

Turning now to FIGS. 3A and 3B, the operation of the present invention with respect to a disc-type rotor is illustrated. For clarity, the coil winding, collector band and electrical connections between the latter and the sliding electrical contacts are omitted. Thus, as FIGS. 3A and 3B illustrate, a plurality of electrical contacts 30 are disposed about disc rotor 32. Electrical conductor 34 has a circular portion 36 which circumscribes contacts 30 and is mechanically (but not electrically) coupled thereto by brackets 38. A magnetic field is oriented axially with respect to rotor 32 and directed out of the plane of the figure, as illustrated by arrow heads 40. This magnetic field encompasses the circular portion 36 of conductor 34.

As illustrated in FIG. 3A, an electric current can be induced in a clockwise direction through the circular portion 36 of electrical conductor 34 as depicted by arrows 42. The interaction of the electric current depicted by arrows 42 and the magnetic field depicted by arrows 40 results in a magnetic force that is exerted inwardly on the circular portion 36 of electrical conductor 34 to maintain electrical contacts 30 in physical contact with rotor 32. The amount of force between contacts 30 and rotor 32 and the corresponding friction is controlled by the magnitude of the current through conductor 34.

To move electrical contacts 30 out of physical contact with rotor 32, an electric current is induced in the circular portion 36 of conductor 34 in a counter-clockwise direction, as illustrated by arrows 44 in FIG. 3B. Thus, electrical contacts 30 can easily be moved into and out of contact with the rotor 32 by controlling a magnitude and direction of the current through condutor 34.

The use of the present invention with a cylindrical rotor 50 is illustrated by way of reference to FIG. 4. A plurality of electrical contacts 52 are disposed about the interior periphery of rotor 50. An electrical conductor is provided which has a circular portion 54 proximate electrical contacts 52 and mechanically coupled thereto by brackets 56. A magnetic field can be applied axially with respect to rotor 50, and the location of contacts 52 with respect to rotor 50 controlled by the magnitude and direction of an electric current induced in the circular portion 54 of the electrical conductor.

While preferred embodiments of the present invention have been illustrated in detail, it is apparent that modifications and adaptations of those embodiments will occur to those skilled in the art. For example, the system could be designed so that the contacts are spaced from the rotor when no current is passing through the conductor and current need be applied in only one direction to move the contacts. Also, the strength and direction of the magnetic field could be varied to move the contacts. In addition, since pulsed magnetic fields are not uncommon in electrical machinery, a continuous direct current could be passed through the conductor and a pulsed current applied to the field winding 15. As the magnetic field gains in strength, the conductor moves toward the rotor to place the contacts into engagement with the rotor. Electrical arcing between the contacts and rotor can be avoided by interrupting the circuit of which the electrical machine is a part—by leaving the load disconnected, for example—until frictional engagement between the contacts and rotor is established. Therefore, it is to be expressly understood that such modifications and adaptations are within the spirit and scope of the present invention, as set forth in the following claims.

What is claimed is:

1. In a system which includes a rotor, a ring of sliding electrical contacts disposed proximate a curved peripheral surface of said rotor, and conductive means connected to said sliding electrical contacts for communicating a transfer current to and from said rotor through said sliding electrical contacts, an improved system for controlling the location of the sliding electrical contacts relative to the rotor comprising:

means for generating a magnetic field generally parallel to the axis of the rotor;
   an electrical conductor having a generally circular portion proximate the ring of sliding electrical contacts;
   means for mechanically coupling the sliding contacts and electrically isolating said contacts from the circular portion of the electrical conductor; and
   means for generating an electric current through the circular portion of the electrical conductor to induce a magnetic force to act upon said circular portion in a direction that varies the degree of frictional engagement of the sliding contacts with the rotor.

2. A system as recited in claim 1, wherein said generating means comprises means for generating an electrical current in either of two circumferential directions through the circular portion of the conductor to induce radial movement of the generally circular portion of the electrical conductor relatively toward and away from the rotor.

3. A system as recited in claim 1, and additionally comprising means for controlling the electrical current through the circular portion of the conductor to control friction between the sliding electrical contacts and the rotor.

4. A system as recited in claim 1, wherein the sliding contacts are disposed about the outer periphery of the curved peripheral surface of the rotor.

5. A system as recited in claim 1, wherein the rotor comprises a cylindrical element, and wherein the sliding contacts are disposed circumferentially about the inner periphery of the curved peripheral surface of said rotor.

6. A system as recited in claim 1, wherein the ring of sliding contacts is disposed about the margin of said rotor in several axially separated loops, and wherein the electrical conductor has a helical portion including several generally circular portions proximate the loops of sliding contacts and mechanically coupled thereto.

7. A system as recited in claim 1, wherein the circular portion of the electrical conductor is oriented generally perpendicular to the magnetic field.

8. In a system which includes a rotor, a plurality of axially separated loops of sliding electrical contacts proximate a curved peripheral surface of said rotor, and current communicating means attached to the sliding electrical contacts for conducting a transfer current to and from the rotor through said sliding electrical contacts, an improved system for controlling the location of the sliding electrical contacts relative to the rotor comprising:

means for generating a magnetic field generally parallel to the axis of the rotor;
   an electrical conductor having several generally circular portions in a helical configuration proximate the respective loops of sliding electrical contacts, at least a segment of the electrical conductor being situated in the magnetic field;
   means for mechanically coupling the sliding electrical contacts to and electrically isolating said electrical contacts from the circular portions of the electrical conductor;
   means for generating an electric current through the circular portion of the conductor to induce a magnetic force thereon; and
   means for controlling the electric current so that the magnetic force displaces the conductor and corresponding electrical contacts coupled thereto in a direction that controls the degree of frictional engagement of said electrical contacts with the rotor.

9. A system as recited in claim 7 wherein the sliding contacts are disposed about the outer periphery of the curved periphery surface of the rotor.

10. A system as recited in claim 7 wherein the rotor comprises a cylindrical element, and wherein the sliding contacts are disposed circumferentially about the inner periphery of the curved peripheral surface of said rotor.

* * * * *